United States Patent
Daggett et al.

[19]

[11] Patent Number: 5,553,072
[45] Date of Patent: Sep. 3, 1996

[54] COMMUNICATION APPARATUS AND METHOD

[75] Inventors: Kenneth E. Daggett; Albert W. Crew, both of Murrysville; James M. Mussler, Bethel Park, all of Pa.

[73] Assignee: Northrop Grumman Corporation, Los Angeles, Calif.

[21] Appl. No.: 380,383

[22] Filed: Jan. 30, 1995

[51] Int. Cl.⁶ .................................................. H04L 12/413
[52] U.S. Cl. ........................ 370/85.3; 370/85.6; 370/85.8
[58] Field of Search ............................ 340/310 R, 825.5; 370/85.2, 85.3, 85.6, 85.7; 395/325

[56] References Cited

U.S. PATENT DOCUMENTS

| | | | |
|---|---|---|---|
| 3,818,447 | 6/1974 | Craft | 370/85.6 |
| 4,332,027 | 5/1982 | Malcolm et al. | 370/85.3 |
| 4,466,096 | 8/1984 | Heins et al. | 370/85.3 |
| 4,494,113 | 1/1985 | Yamaoka et al. | 370/85.6 |
| 4,536,875 | 8/1985 | Kume et al. | 370/85.3 |
| 4,611,274 | 9/1986 | Machino et al. | 340/310 R |
| 5,090,024 | 2/1992 | Vander Mey et al. | 370/85.3 |

OTHER PUBLICATIONS

"Multiaccess Protocols in Packet Communication Systems" by F. A. Tobagi, IEEE Transactions on Communications, Apr. 1980, vol. COM-28, No. 4. pp. 468-488.

*Primary Examiner*—Benedict V. Safourek

[57] ABSTRACT

An apparatus and method for media access control of a first node in a network on a powerline communication medium. The apparatus includes a priority controller for providing a transmit authorization signal. The authorization signal can be responsive to a unique priority of the first node in relation to other nodes in the network, with the priority controller receiving the node's priority from a node network controller in the first node. The apparatus includes an access controller for receiving the transmit authorization signal and, in response, communicating a transmit request signal to the node network controller. The apparatus also includes an arbitration controller for preventing the node from transmitting to the network until a predetermined number of other nodes have been allowed to precedentially access the network. The arbitration controller responds to the priority controller, and sends a transmit inhibition signal to the access controller, inhibiting node transmission irrespective of the authorization signal. The invention also provides a method for communication by a first node in a network having a plurality of nodes, including the steps of sensing a powerline communication medium for the presence of a carrier signal by the first node; inhibiting transmitting by the first node to the network if the presence of the carrier signal is sensed; and transmitting at least one data packet, if the carrier signal is not sensed on the network and the current priority period corresponds with a first predetermined priority period.

22 Claims, 9 Drawing Sheets

COMMUNICATION APPARATUS AND METHOD

BACKGROUND OF THE INVENTION

1. Field of the Invention

The invention relates to communication methods and apparatus, in particular, communication methods and apparatus using electric power lines as communications media, and more particularly, powerline communications methods and apparatus using packetized network techniques.

2. Description of the Art

There is an increasing demand for intrabuilding local area networks (LAN's). Intrabuilding electric power distribution lines are potentially useful as a LAN because they are virtually universal in building coverage. However, electric power distribution lines are not designed for communications. As such, they suffer from unpredictable variations in impedance, signal attenuation, and noise. Because of these anomalies, powerline communications systems have been characterized as being relatively low-data-rate, and high-error-rate systems.

In general, in systems with multiaccess channels, such as powerline communications systems, all users share a common transmission medium over which they transmit their packets. Therefore, such systems require resolution of conflicts which arise when more than one demand is placed upon the channel. Whenever a portion of one user's transmission packet overlaps with another user's transmission packet, the two transmission packets collide and obliterate each other. Multi-access broadcast operation must entail either an implicit or explicit method for allowing nodes to share the medium without unduly interfering with each other. These network arbitration methods are generally referred to as Media Access Management, and can be specifically referred to as Media Access Control (MAC).

One MAC arbitration method that is commonly used for communication systems is called carrier sense multiple access (CSMA). CSMA can be highly efficient for environments where the propagation delay is short compared with the transmission time of a packet on the channel. In CSMA schemes, the transmission medium is shared by all user devices, and the medium is allocated to each user for the time required to transmit a single packet. Each user device is connected to the common channel through an interface that listens to all transmissions and receives packets addressed to it.

In general, CSMA requires that each device on the channel sense the carrier due to other devices' transmission and inhibit transmission when the channel is in use, thereby reducing the level of interference caused by the overlapping transmission packets. Packets which either are inhibited or suffer a collision are rescheduled for transmission at a later time according to some rescheduling policy.

Packet rescheduling may incorporate prioritization schemes such as rescheduling a packet transmitted according to a given priority class. Such prioritization schemes can include, for example, the use of pre-assigned time slots for each device on the channel, whereby a given device may transmit if no carrier is sensed on the channel during its time slot. The time slot assignment may or may not be unique. Typically, these MAC schemes also require the use of some definable point at the end of a message to begin the time slot counting. One such point is the sensing of the end-of-carrier (EOC) condition on the channel.

Further, prioritization may be device- or message-based. Device-based priority can tie priority to a device's status in a system hierarchy, to recent transmission activity by that particular device, and the like. Message-based priority can derive a device's rescheduling priority from the content of the message in the packet. Prioritization may range from fully pre-emptive to non-pre-emptive. A non-preemptive priority scheme can require a device to simply "wait its turn" until a pre-assigned device time slot becomes current. At the other end of the spectrum, a fully-preemptive priority scheme can permit a device to preempt the ongoing transmission of another device by intentionally causing a collision.

A often-used form of CSMA is carrier-sense multiple access with collision detection (CSMA-CD) where each transmitting device compares the bit stream it is transmitting to the bit stream it sees on the channel. With CSMA-CD, it is possible for the transceivers to detect interference among several transmissions, including their own, and to abort the transmission of colliding packets.

In powerline applications, the aforementioned CSMA MAC schemes may not provide robust, high-performance broadcasting because of the severely limited bandwidth available for transmissions in the powerline milieu; and because powerline system transmitters typically are unable to receive information while transmitting and, thus, are unable to detect a packet collision or a network anomaly during a transmission. In general, a powerline transmitter can detect collisions only if it does not receive an acknowledgement from its packer's intended recipient.

CSMA-CD is also hampered in a powerline environment by the large disparity between transmit and receive signal strengths, the low impedance placed on the network by an active transmitter, and the substantial noise level inherent in powerline systems. In addition, end-of-carrier cannot be used in powerline communications systems because sensing the end-of-carrier condition is confounded by factors such as delays in receiver filters, media noise, the lack of characterization of the media, and the like.

What is needed, then is a robust, high-performance, low-cost powerline communication method and apparatus.

SUMMARY OF THE INVENTION

The invention herein provides for an apparatus and method for communication. The apparatus for media access control of a first node in a network includes a priority controller for providing a transmit authorization signal authorizing the first node to transmit to the network through a powerline communication medium. The authorization signal can be responsive to a priority of the first node in relation to other nodes in the network, with the priority controller receiving the node's priority from a node network controller in the first node.

The apparatus includes an access controller, connected to the priority controller and the node network controller, for receiving the transmit authorization signal. The access controller communicates a transmit request signal to the node network controller responsive to the transmit authorization signal.

The apparatus can also include an arbitration controller for preventing the node from transmitting to the network until a predetermined number of other nodes have been allowed to access the network according to a preselected arbitration precedence, which precedence can be received from the node network controller. The arbitration controller can be responsive to the priority controller, and can send a transmit inhibition signal to the access controller, inhibiting node transmission irrespective of the authorization signal.

The priority can include a node drop priority and a network size. The node drop priority is a unique position, or access slot, determined in a preselected network drop priority cycle, respective of the positions, or access slots, of other nodes in the drop priority cycle.

The priority controller can include a storage for receiving the node drop priority from the node network controller; a priority monitor, or timer, for determining a current priority respective of all nodes in the network; and a priority comparator, connected between the storage and the priority monitor, for comparing the current priority and the node drop priority, with the comparator transmitting the transmit authorization signal when the current priority corresponds with the node drop priority.

The arbitration controller can include an arbitration storage for receiving a preselected maximum arbitration cycle length from the node network controller; an arbitration timer for providing a current arbitration cycle length; and an arbitration comparator, connected to the arbitration storage and the arbitration timer, for comparing the current arbitration cycle length with the preselected maximum arbitration cycle length. The arbitration comparator provides the transmit inhibition signal to the access controller.

The apparatus can also include first synchronizing means for synchronizing the priority controller with the arbitration controller; and second synchronizing means for synchronizing the priority controller and the arbitration controller of one node with priority controllers and arbitration controllers of the respective other nodes. Both synchronizing means can be responsive to a transmission on the network, particularly when the transmission includes a predefined character, such as the FLAG character, having binary sequence 01111110, therein.

The invention also provides a method for communication by a first node in a network having a plurality of nodes. This method includes the steps of sensing a powerline communication medium for the presence of a carrier signal by the first node; and inhibiting transmitting by the first node to the network if the presence of the carrier signal is sensed; and transmitting at least one data packet, if the carrier signal is not sensed on the network and the current preselected period corresponds with the first predetermined priority period.

In addition, further inhibiting of packet transmission is effected for a first predetermined priority period after the termination of the carrier signal, with the first predetermined priority period being uniquely assigned to the first node in a predefined relation to predetermined priority periods uniquely assigned to respective others of the plurality of nodes. Also, transmission inhibition may be made to persist during the first predetermined priority period if said carrier signal is sensed on said network.

Each of the predetermined priority periods can include an intermission and a plurality of access slots. Respective ones of the access slots being uniquely assigned to respective ones of the nodes in the network. The intermission is interposed between the termination of carrier signal and the plurality of access slots.

In addition, the predetermined priority period can include an arbitration cycle which has at least one drop priority cycle therein. A drop priority cycle includes a predetermined number of access slots corresponding to a predetermined number of nodes in the network. In general, the drop priority cycle follows the intermission.

Other details, objects, and advantages of the invention will become apparent as the following description of certain present preferred embodiments thereof proceeds. The accompanying drawings show presently preferred embodiments of the invention.

DESCRIPTION OF THE EMBODIMENTS

Figure 1:
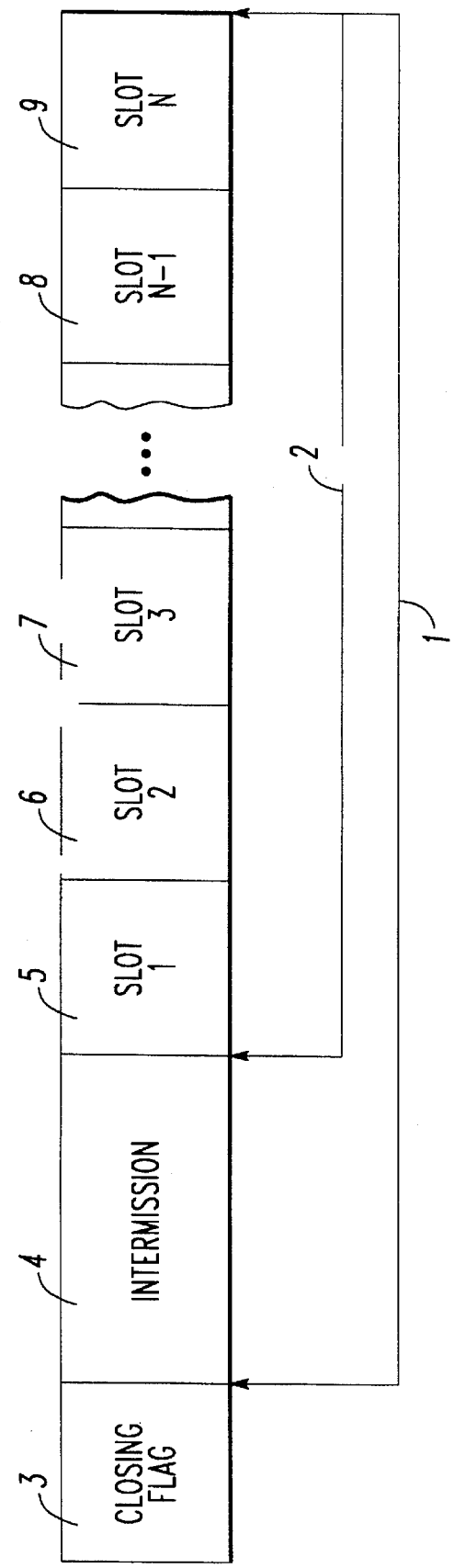
FIG. 1 is an illustration of the pattern of one arbitration cycle according to the invention herein.

The apparatus and method according to the invention herein implement a multi-access, or shared access, communications network in which devices in multiple nodes communicate using a powerline carrier. Each node is attached to the communication channel, i.e., the powerline, by a node network controller. A description of this node network controller can be found in co-pending application Westinghouse Electric Co. case no. 58,533, which is incorporated herein by reference. Signals transmitted over the channel by controllers take the form of HDLC-like packets. The description of these packets and the apparatus and method for modulating and demodulating the same can be found in co-pending application, Westinghouse Electric Co. case 58,532, which is incorporated herein by reference. Any given packet is received by all other controllers in the network. Each network controller determines, based on its address, whether to accept the packet. The MAC method can define the set of rules or procedures used by network nodes to control media access.

The MAC method according to the invention herein employs a type of distributed control, which shall be called Carrier Sense Multiple Access with Synchronous Collision Avoidance (CSMA/SCA). With CSMA/SCA, each node is assigned a predetermined priority period for transmission, based on its position in a logical list of nodes. This priority period can be manifested by the position of a node's access slot with respect to the access slots of other nodes. It is preferred that each predetermined access slot is unique, and is uniquely assigned to a node.

An access slot can consist of one or more data bit time intervals, or time slots. The aggregate of all access slots for a particular node can be referred to as a network drop priority cycle. An arbitration cycle can consist of one or more drop priority cycles. The length of the time slots, the number of time slots per access slot, and the number of drop priority cycles per arbitration cycle can be increased or decreased to suit the communication needs of the network and, indeed, may be done adaptively, during network operation.

In CSMA/SCA, each node waits a unique period of time after a transmission ends, corresponding to its preassigned access slot, and then checks for the presence of carrier on the media. If no other node has begun to transmit by the time a particular node's waiting time has elapsed, it may obtain access to the media.

Two factors can determine the number of time slots required for a node to obtain access to the network. The first factor relates to the number of time slots required for a node to determine if network carrier is present. A coherent signal discrimination method can be used to sense the presence of carrier. Carrier detection is presently preferred to require 2 time slots.

The second factor that must be considered relates to the time required to apply carrier to the network after it has been determined that the media is idle. This requires one time slot. Thus, three time slots are presently preferred to be allocated for each access slot so that each node may obtain network access.

The completion of reception of a packet closing FLAG initiates slot time counting. The closing FLAG is preferred to be binary sequence 01111110 and provides an accurate synchronizing means of slot time counting for all nodes in the network, because every node senses completion of the closing FLAG at essentially the same point in time. However, some network idle time is required following closing FLAG reception before a node can accurately sense the presence of carrier. This time is added as an offset from the closing FLAG, or intermission, in determining the access slot. The minimum value for the intermission is approximately 10 time slots.

This method also can include a deterministic media access mode. Deterministic operation ensures that any given node will be guaranteed access to the media within some deterministic time period. Under this procedure, called arbitration, network nodes are not permitted subsequent media access, after having initially obtained access during a particular arbitration cycle, until all network nodes have had a predetermined number of access opportunities. The number of access opportunities can be equal to the number of drop priority cycles selected for each arbitration cycle. In one embodiment, prioritization can be effected by Priority Acknowledgment, that is, where the first time slot is reserved for the node that received the message last transmitted, allowing the node to acknowledge the message.

In FIG. 1, one arbitration cycle 1 containing one drop priority cycle 2 is illustrated to be following the closing FLAG 3 of a data packet. Interposed between closing FLAG 3 and drop priority cycle 2 is intermission 4 which can be 10 time slots, or data bit intervals, in length. Drop priority cycle 2 can consist of N access slots, with the number of access slots 5, 6, 7, 8, 9 corresponding to the number of nodes, N, on the network. The length of access slots 5, 6, 7, 8, 9, can be adjusted to satisfy network conditions and in one embodiment it is preferred that each access slot 5, 6, 7, 8, 9, is preferred to be about 3 time slots long.

For example, the node having location N-1 on the node list can be assigned the N-1 access slot 8. In a deterministic mode, all nodes on the network can initiate identical arbitration cycles 1 upon reception of closing FLAG 3, which cycle 1 on one node thus is synchronized with cycle 1 in other nodes on the network. Even if node N-1 is ready to transmit a data packet upon receipt of closing FLAG 3, node N-1 will wait to attempt transmission until the N-1 access slot 8 becomes current. If node N-1 does not sense carrier on the medium, packet transmission is begun. During access slot 8, no other node will attempt to transmit in view of the synchronization among nodes.

Arbitration cycle 1 may consist of multiple, or M, drop priority cycles. This is useful when it is desired to prevent the node with the most recent media access from regaining access to the media until other nodes on the network have had M opportunities to gain access. Continuing with the above example, where each arbitration cycle 1 includes three (3) drop priority cycles 4, node N-1 can be inhibited from regaining access to the medium until each of the other nodes on the network have had three opportunities to transmit a data packet. If it happens that no node wishes to transmit during the entire arbitration cycle, the network may remain idle during that time.

This method also can provide for entering a general CSMA, or "free-for-all", mode if no node takes control of the media by initiating a transmission during a given arbitration cycle. After the predetermined number of drop priority cycles in a particular arbitration cycle have been traversed without transmission, the deterministic mode of operation ceases, thus permitting the next transmitter that intends to transmit a packet to access the medium, regardless of its position on the node list.

Figure 2:
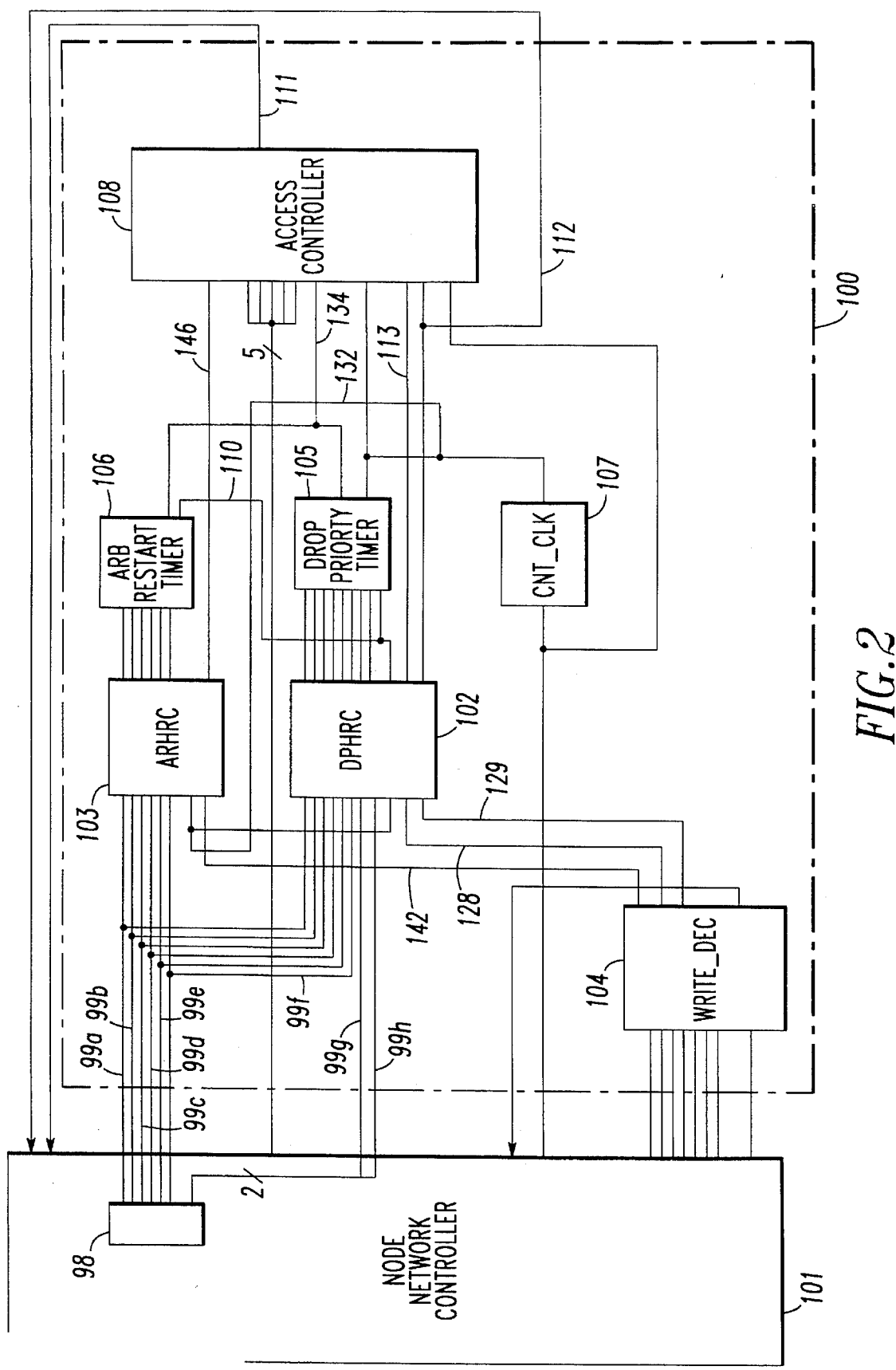
FIG. 2 is a block diagram of the apparatus according to one embodiment of the invention herein.

FIG. 2 is a diagram of one embodiment of communication apparatus 100 according to the invention herein. Apparatus 100 is operably connected to the powerline and can be used in conjunction with node network controller 101, which node network controller 101 can intend to transmit information from the transmitting host, or node, through the powerline medium. Node access priority can be determined by a priority controller which can include drop priority holding register and comparator (DPHRC) 102 and drop priority timer 105 and which can provide for media access control in communication with access controller 108.

Node network controller 101 can write configuration data into DPHRC 102 following power-on reset during initialization of an associated LAN controller. An I/O address relative to node network controller 101 can be assigned to each of the registers found in DPHRC 102 and arbitration restart holding register and comparator (ARHRC) 103 so that node network controller 101 can download network configuration information to apparatus 100.

DPHRC 102 can be used to demarcate the size of the network. In addition, DPHRC 102, in conjunction with drop priority monitor or timer 105, can determine the boundaries and duration of the access slots, and using ADV_ARB signal 110, initiate a new network arbitration cycle. ARHRC 103 can establish the number of drop priority cycles per arbitration cycle for which the network is configured and, in conjunction with arbitration restart timer 106, can indicate when an arbitration cycle has completed. All nodes in the network should be configured for operation with the same arbitration cycle value.

Decoder WRITE_DEC 104 can implement the address decoding and write pulse generation used to store data in the registers in DPHRC 102 and ARHRC 103. Access controller 108 can provide a transmit request signal, XMT_REQ signal 111 to alert the network that node network controller 101 intends to transmit information through the medium. Signal 111 is asserted when either media access control is halted, as indicated by a logical high on DIS_MAC signal 112, or the access slot at hand is one that has been uniquely assigned to the device, as indicated by a logical high on the transmit authorization signal, DRP_CEQ signal 113.

Embodiments of DPHRC 102, ARHRC 103, WRITE_DEC decoder 104, timers 105 and 106, counter 107, and access controller 108 are illustrated in FIGS. 3–9, respectively, and their descriptions follow herewith.

Figure 3:
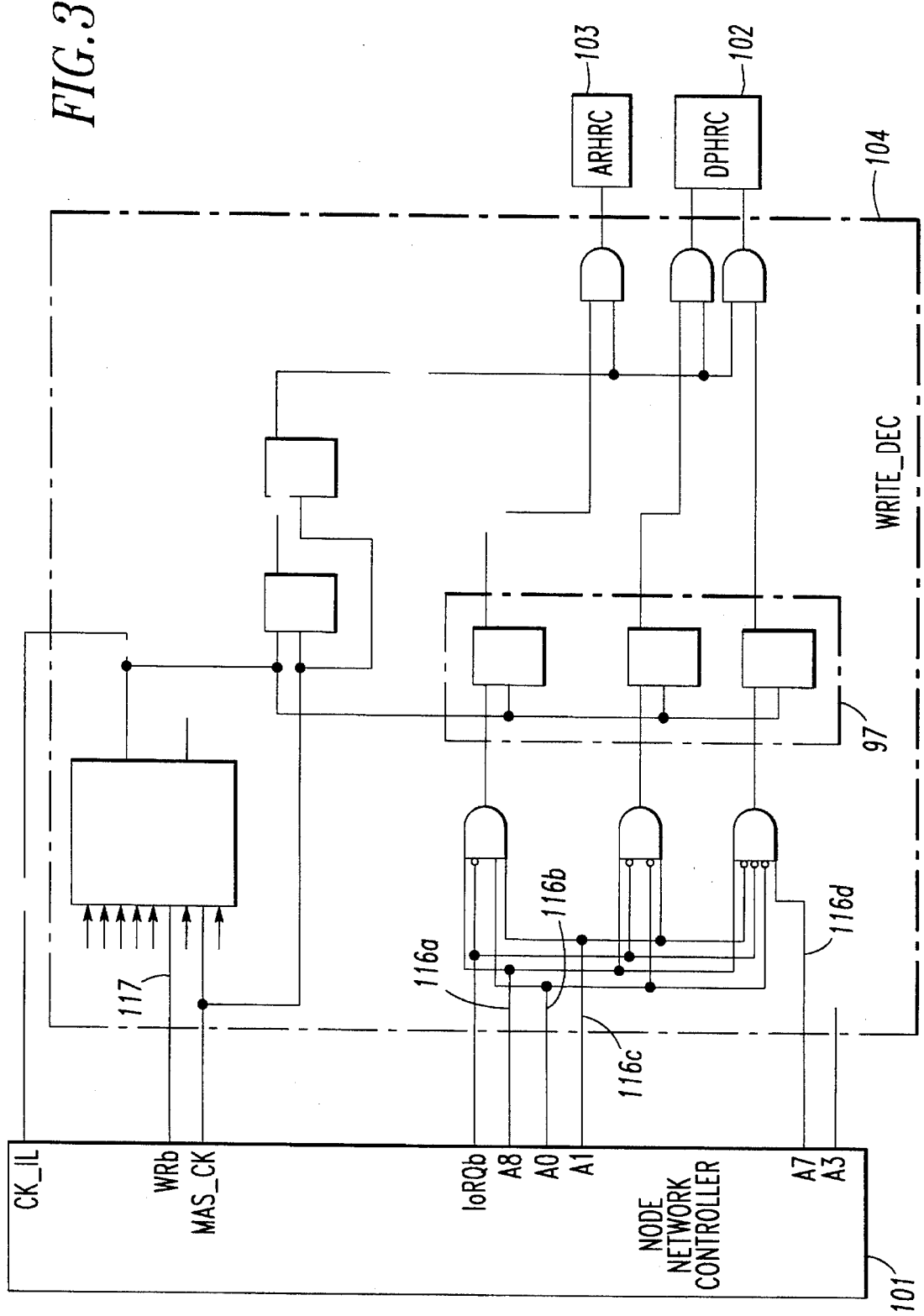
FIG. 3 is a schematic diagram of a data-write decoder.

FIG. 3 illustrates one embodiment of WRITE_DEC decoder 104. WRITE_DEC decoder 104 provides the necessary address decoding, and ensures that data are correctly stored in the registers in DPHRC 102 and ARHRC 103, essentially independent of internal signal propagation delays. Input data signals 99a–h can first be written into input data latch 98. Latch 98 may be located in controller 101 or in apparatus 100. Decoded address signals 116a–d are also temporarily latched in input address latch 97 (FIG. 3). Input data signals 99a–h are then transferred from the input data latch 98 to the respective address registers in DPHRC 102 and ARHRC 103 after de-assertion of WRb node network controller write signal 117.

Figure 4:
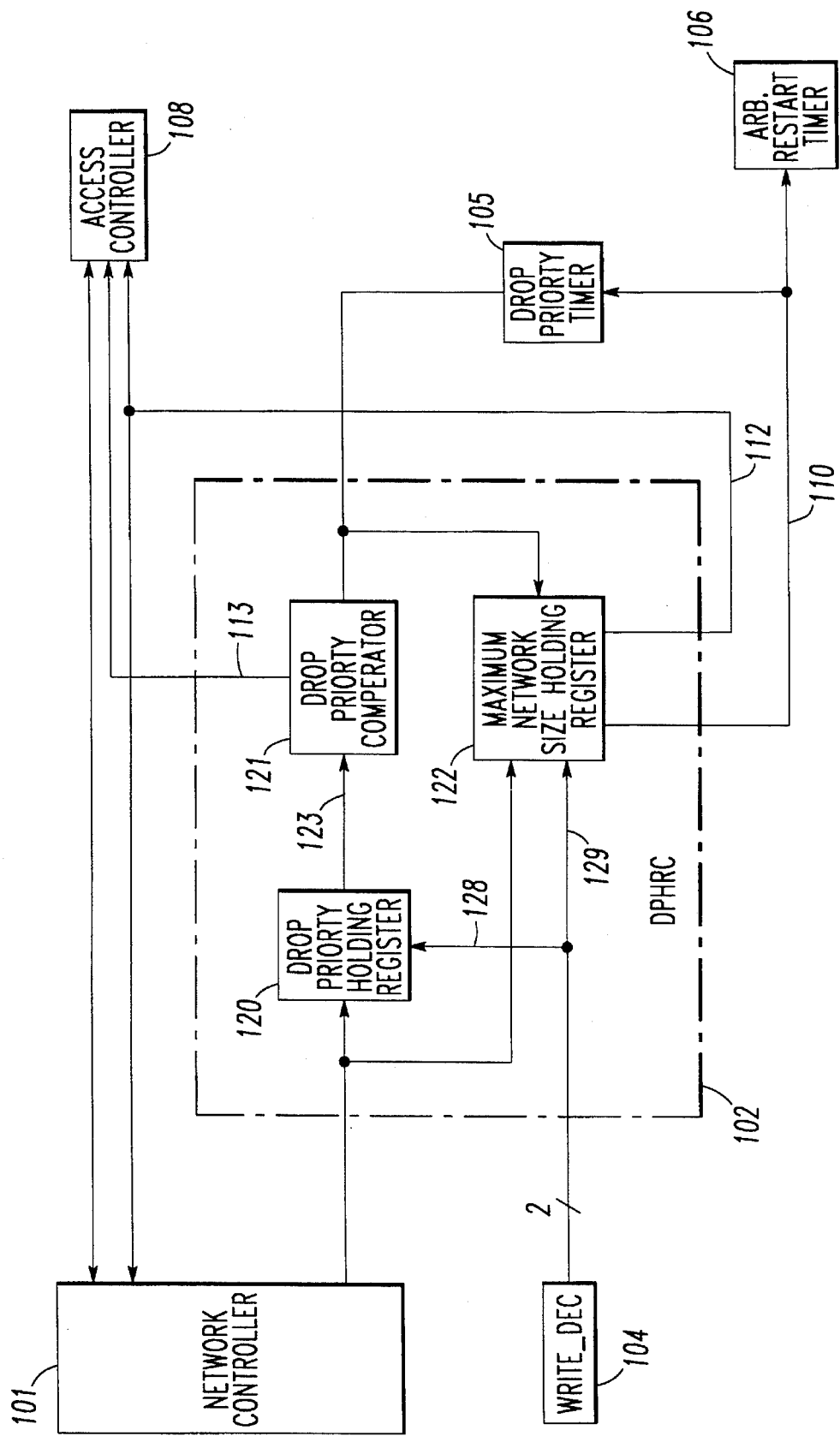
FIG. 4 is a block diagram of a drop priority holding register and comparator.

FIG. 4 illustrates one embodiment of DPHRC 102. DPHRC 102 can have data storage which includes drop priority holding register 120 and maximum network size holding register 121. Node network controller 101 can download device drop priority, or slot, information to drop priority holding register 120 upon assertion of signal 128 from WRITE DEC signal 104. Register 120 contains the unique slot, or drop priority, at which a respective node can attempt to retransmit rescheduled packets, and can be configured to store 8 bits of data, as here. Each time slot is one bit time in duration.

Signal 123 from register 120 can provide one set of inputs to drop priority comparator 121, which can also be configured to accept 8 bits of data. Drop priority timer 105 can provide the other set of data inputs to comparator 121. DRP_CEQ signal 113 from comparator 121 is asserted when the contents of register 120 identically equals the value produced by timer 105. Drop priority timer 105 is incremented at the network transmission bit rate, thus synchronizing the node, containing the apparatus described herein, with its unique access slot.

Continuing in FIG. 4, node network controller 101 can also download network configuration information to maximum network size holding register 122 upon assertion of output 129 from WRITE_DEC decoder 104. Register 122 stores configuration data that relates to the maximum size of the network. Additionally, a logical bit in register 122 also permits software control enable or disable the MAC operation.

Register 122 can be driven by timer 105. Usage of 8-bit drop priority timer 120 implies that there are a maximum of 256 drop priority slots. However, in one embodiment of the invention herein, additional circuitry associated with register 122, limit the maximum drop priority slots to a number less than 256. This circuitry is associated with establishing the maximum network size and constraints on the number of drop priority slots. This constraint can effectively limit the network size by limiting the number of controller network access slots.

Assertion of ADV_ARB signal 110 can increment the arbitration restart timer 106, which can act as the network arbitration cycle counter, force drop priority timer 120 to be reset, and initiate a new network arbitration cycle. ADV_ARB signal 110 can be asserted according to contents of register 122 as described in Table 1.

TABLE 1

| Register 122 Contents (Hexadecimal Value) | Maximum Network Size (Slot Times) |
|---|---|
| 0 | 208 |
| 1 | 16 |
| 2 | 32 |
| 4 | 64 |
| 8 | 128 |
| 16 | MAC Disabled |

Figure 5:
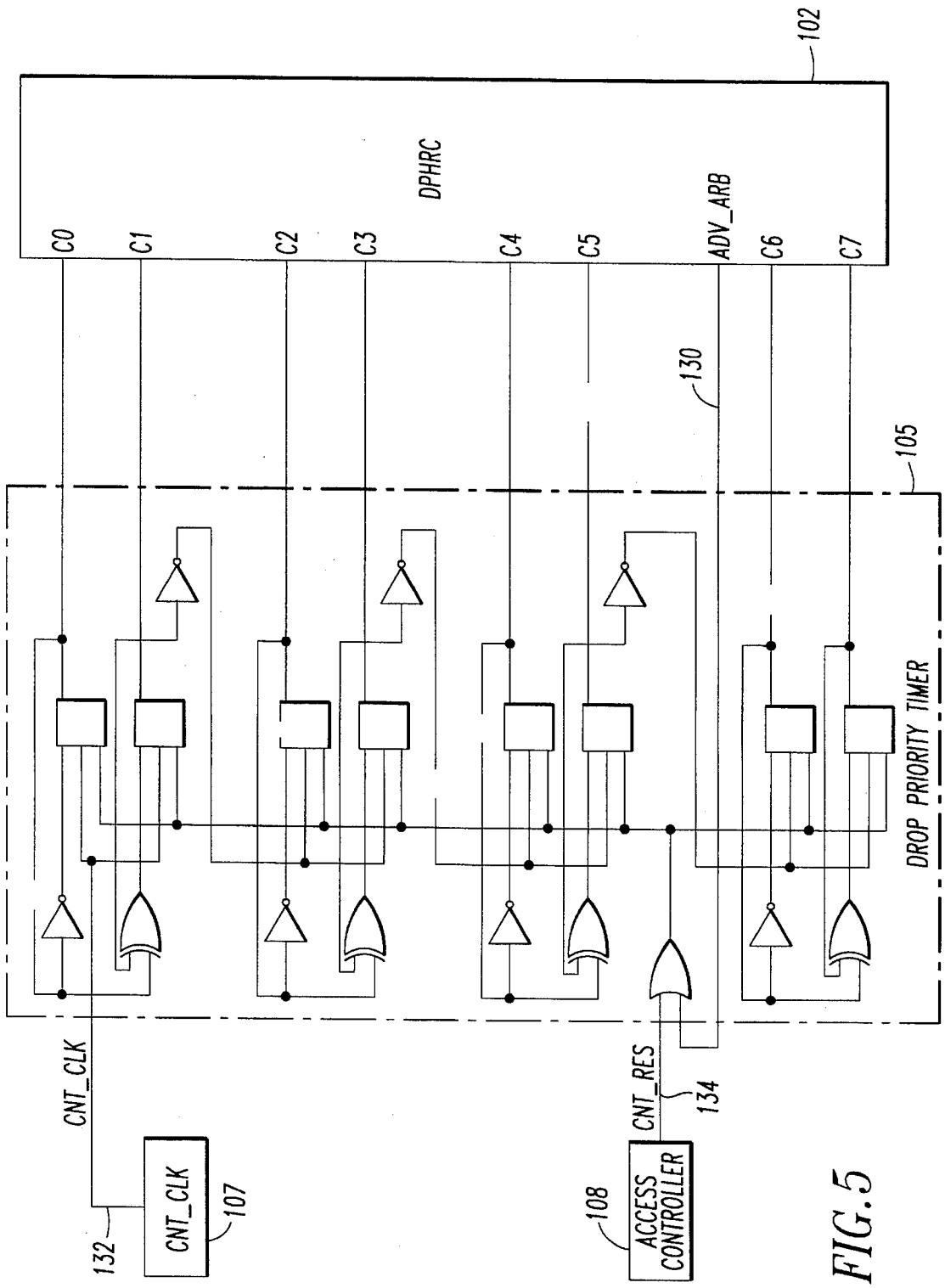
FIG. 5 is a schematic diagram of a drop priority timer.

FIG. 5 is a diagram of one embodiment of drop priority timer 105. Timer 105 is driven by the clock input signal 132 from the divide-by-forty counter CNT_CLK 107 found in FIG. 9. In addition, timer 105 can also be reset from either of ADV_ARB signal 110 issued by register 122 in FIG. 4, wherein a new network arbitration cycle is initiated, or by CNT_RES signal 134 which is issued by controller 108 (FIG. 8), indicating that a packet was received.

As stated hereinbefore, some network idle time is required following closing FLAG reception before a node can accurately sense the presence of carrier. This time is added as an offset in calculating the constant associated with drop priority holding register 120, and is presently preferred to be at least 10 bit times.

A node can obtain network access when the value of drop priority, or slot, timer 105 equals the value in drop priority holding register 120, provided another node has not obtained access to the network. There is an implicit priority for obtaining access to the network with the method employed herein. Each node's priority is established by the value loaded in drop priority holding register 120, which specifies the slot time for access by the node. Nodes with a lower drop priority value are permitted access before nodes with a higher drop priority value.

Figure 6:
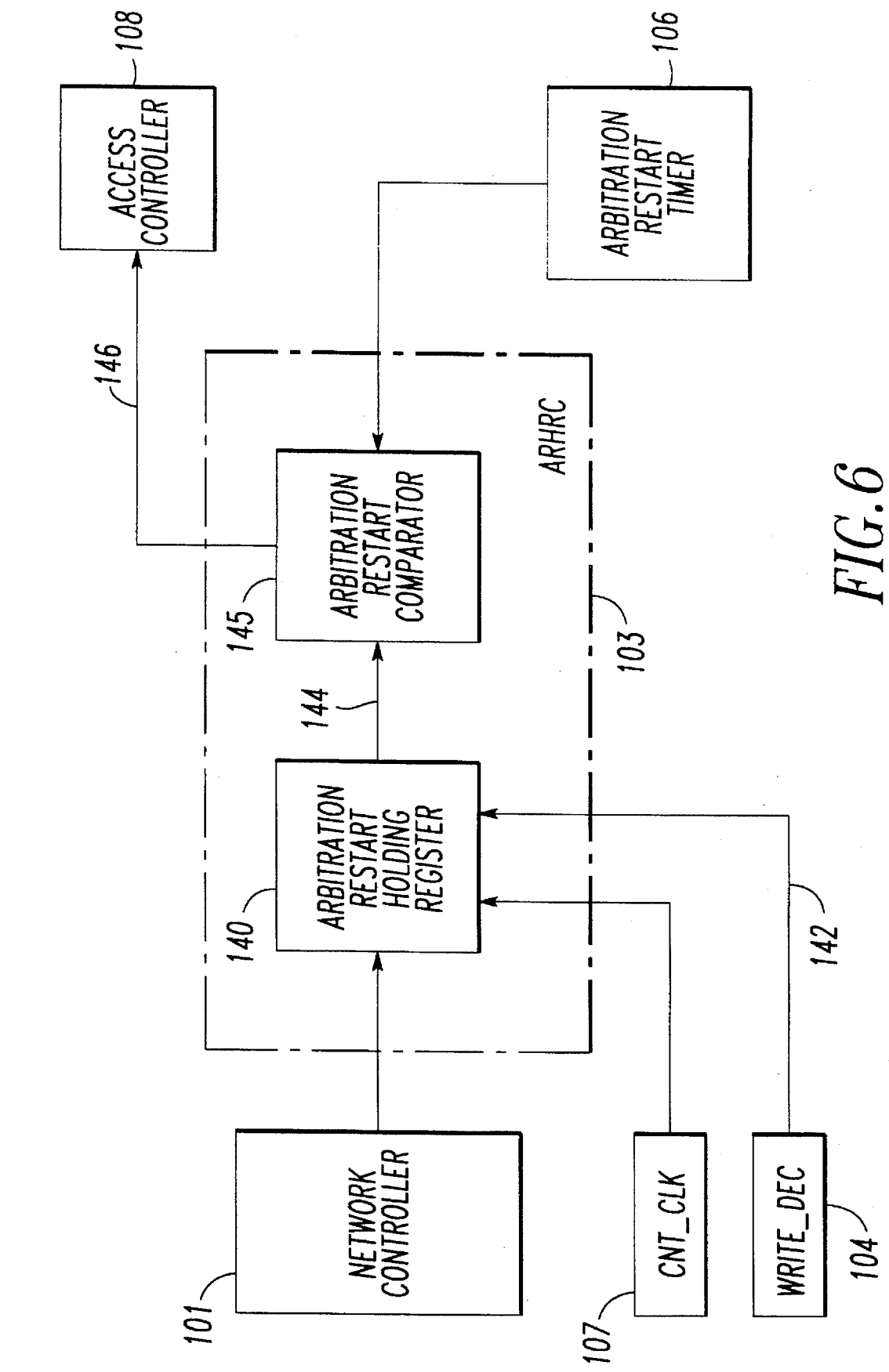
FIG. 6 is a block diagram of an arbitration restart holding register and comparator.

Arbitration in CSMA/SCA can be effected by an arbitration controller which can include ARHRC 103 and arbitration restart timer 106, and which can receive arbitration precedence from node network controller 101. FIG. 6 is an illustration of ARHRC 103. Arbitration restart holding register 140 can store the number of network arbitration cycles that are allotted to ensure that all network nodes have opportunity to obtain the shared media. Register 140 can receive this information from node network controller 101 upon assertion of output 142 from WRITE_DEC decoder 104. In one embodiment, register 140 can store 6 bits of data. Output 144 of register 140 can provide one set of inputs to arbitration restart comparator 145, which also can be implemented in a 6-bit width.

Arbitration restart timer 106 can provide the other set of data inputs to comparator 145. ARB_CEQ signal 146 from comparator 145 can be asserted when the contents of register 140 identically equals the value in timer 106. This condition can establish the number of arbitration cycles involved with the network. All nodes in the network should be configured for operation with the same arbitration cycles value.

Figure 7:
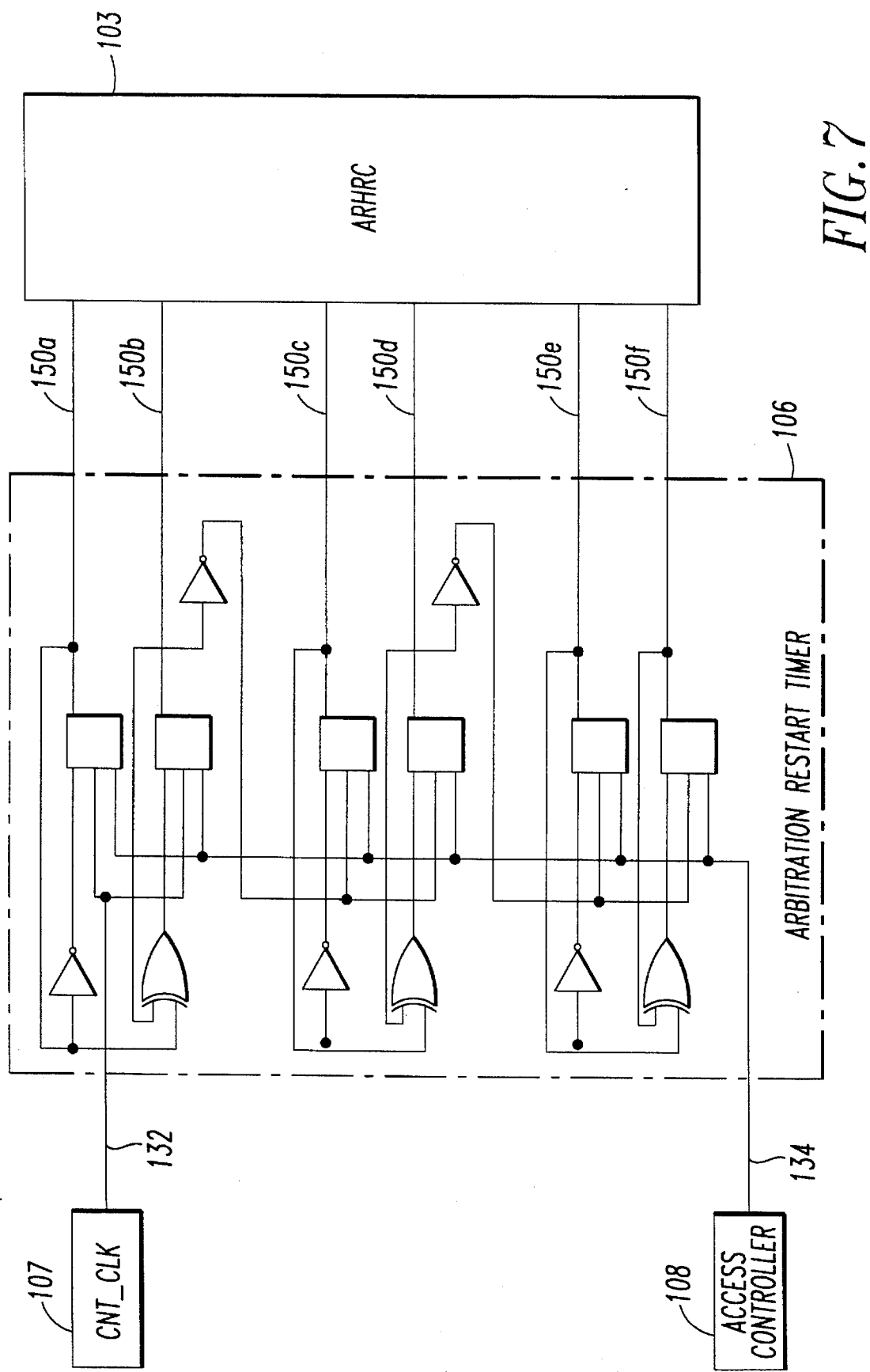
FIG. 7 is a schematic diagram of an arbitration restart timer.

FIG. 7 is a logic diagram of arbitration restart timer 106 which is incremented by assertion of ADV_ARB signal 110, as described above. Timer 106 also can be reset by the assertion of CNT_RES signal 134 from controller 108. Usage of a 6-bit arbitration cycle counter provides six outputs 150a–f to ARHRC 103 (FIGS. 2 and 6), and implies the usage of a maximum of 64 arbitration cycles. This embodiment, therefore, can limit the maximum number of node addresses in any given network to 64, thereby assuring each node access to the network at least once every arbitration cycle. It is preferred that the number of arbitration cycles provided should not exceed the maximum number of nodes in the network.

Figure 8:
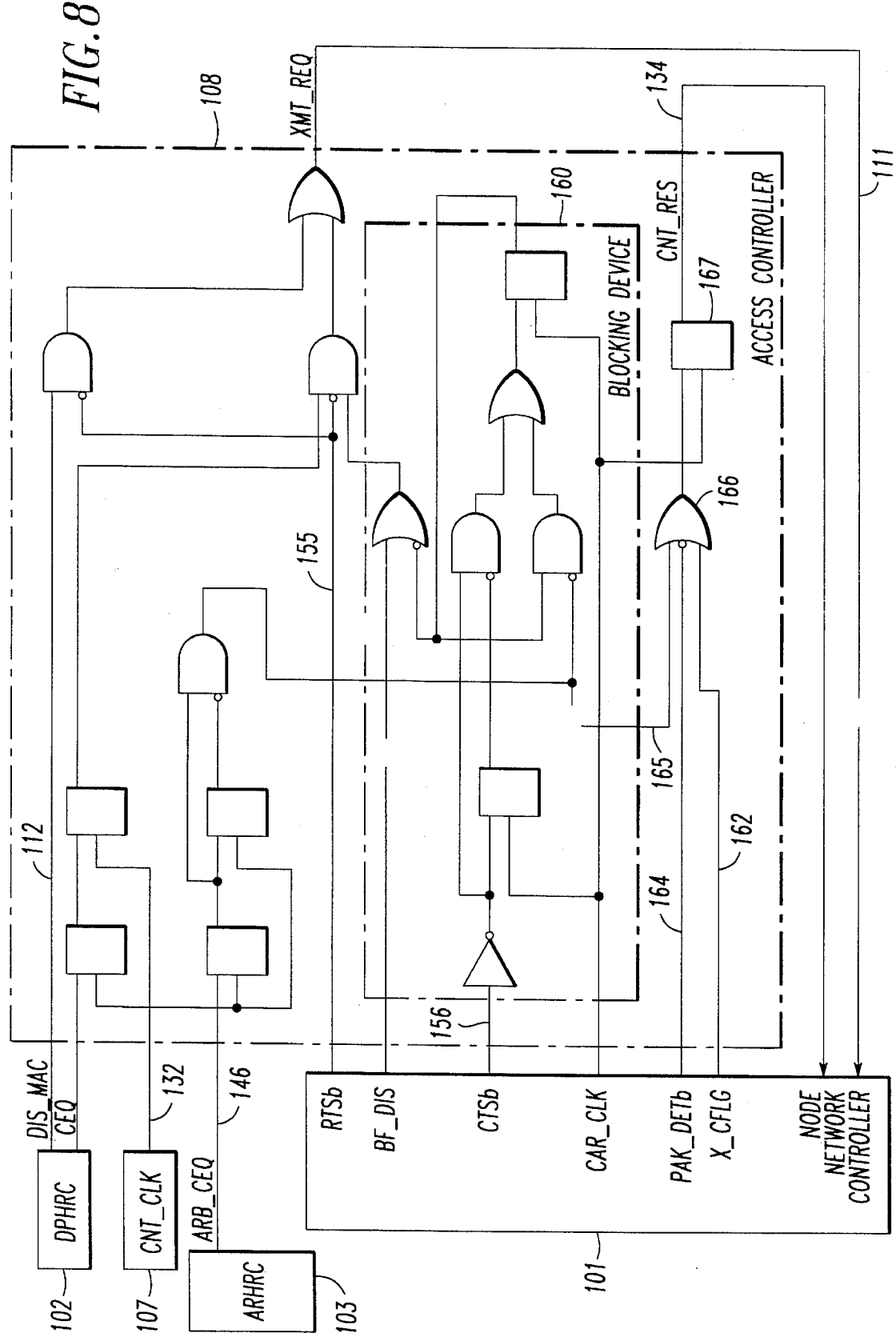
FIG. 8 is a schematic diagram of an access controller.

Access controller 108 is schematically represented in FIG. 8, and provides the overall control of the enabling of the counters. Under conditions described below, controller 108 asserts XMT_REQ (transmit-request) signal 111 in response to assertion of RTSb (request-to-send) signal 155 by transmitter logic within node network controller 101. Node network controller 101 may not start the actual transmission until it senses assertion of CTSb (clear-to-send) signal 156 by transmitter logic in node network controller 101.

XMT_REQ signal 111 will be asserted in response to RTSb signal 155 under either of two conditions. First, XMT_REQ signal 111 will be asserted if DIS_MAC signal 112 is asserted by DPHRC 102. This condition corresponds to node network controller 101 having written a value of 16 into register 122 (FIG. 4). Secondly, XMT_REQ signal 111 will be asserted if drop priority timer conditions are satisfied, as indicated by assertion of DRP_CEQ signal 113.

DRP_CEQ signal 113 is asserted for one bit time interval, and provides input to the two stage shift register formed by flip-flops U241 and U242. The output of U242 provides one of the enabling inputs to AND gate U239, along with RTSb signal 155. The remaining enable signal input to U239 is generated by blocking device 160. The components including inverter U237, OR-gates U233 and U238, AND-gates U231 and U232, and D flip-flop U234 can be used to make blocking device 160, as configured in FIG. 8. The logic of blocking device 160 can restrict access of a given node to the network, once access has been gained, until the drop priority cycle has been completed. Blocking device 160 can receive transmit inhibit signal, ARB_CEQ signal 146, from ARHRC 103.

Drop priority timer 105 (FIGS. 2 and 5) and arbitration restart timer 106 (FIGS. 2 and 7, are both reset in response to node network controller output X_CFLG (transmit closing flag) signal 162 and PAK_DETb (packet detect) signal 164, and signal 165 from blocking device 160, as signals 162, 164, and 165 are processed by OR-gate 166 and D flip-flop 167. The reset of timer 105 and 106 occurs upon the assertion of PAK_DETb signal 164, and remains reset until the closing FLAG is received as indicated by the assertion of X_CFLG signal 162.

Figure 9:
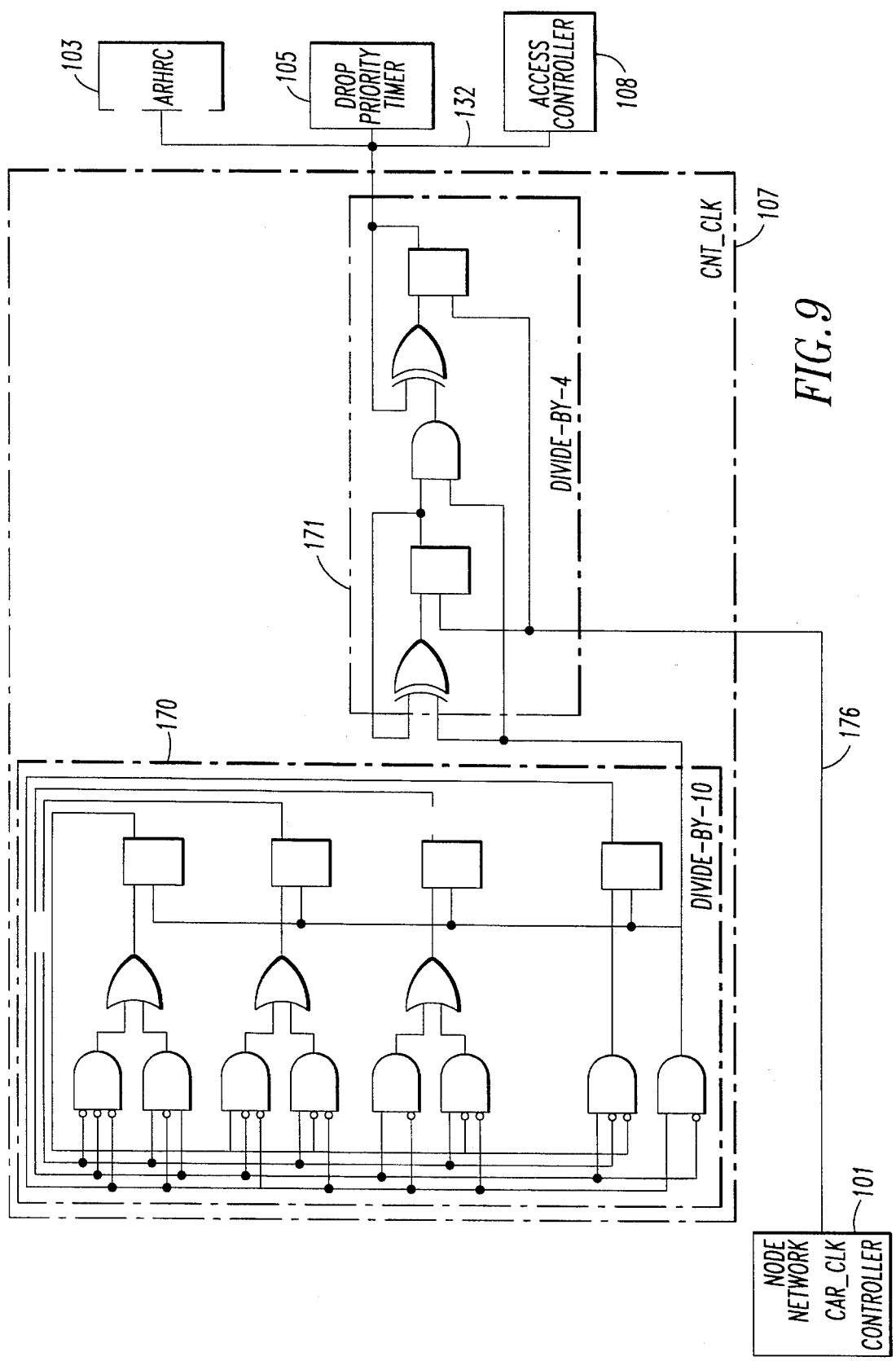
FIG. 9 is a schematic diagram of a counter.

Divide-by-40 counter CNT_CLK 107 in FIG. 2, is given schematically in FIG. 9, and can serve as a first synchronizing means for the priority and arbitration controllers. Counter 107 derives the bit clock independent of the clock signal in node network controller 101 that is used to shift serial data. Counter 107 can implemented by using divide-by-10 counter 170 in series with divide-by-4 counter 171 to generate CNT_CLK signal 132. Because each station can typically have its own time base, timers 105 and 106 in each node can lose synchronism if no transmissions occur on the network for a significant period of time, due to the minor differences in the frequency of each station's time base.

This effect can result in an increased potential for packet collisions. However, when transmission rates are low, the chance of a collision is also low and the overhead associated with the retransmission can be easily tolerated. Any transmission can resynchronize the timers in all nodes by way of PAK_DETb signal 164.

While specific embodiments of practicing the invention have been described in detail, it will be appreciated by those skilled in the art that various modifications and alternatives to those details could be developed in light of the overall teachings of the disclosure. Accordingly, the particular arrangements and methods disclosed are meant to be illustrative only and not limiting to the scope of the invention which is to be given the full breadth of the following claims, and any and all embodiments thereof.

We claim:

1. An apparatus for media access control of a first node in a network, comprising:

a. a priority controller for providing a transmit authorization signal authorizing said first node to transmit to said network through a powerline communication medium responsive to a powerline carrier signal, said authorization signal being responsive to a priority of said first node in relation to other nodes in said network, said priority controller receiving said priority from a node network controller in said first node; and b. an access controller for receiving said transmit authorization signal, said access controller being connected to said priority controller and said node network controller, said access controller communicating a transmit request signal to said node network controller responsive to said transmit authorization signal.

2. The apparatus of claim 1 further comprising an arbitration controller for preventing said first node from transmitting to said network until a predetermined number of said respective other nodes have been allowed to access said network according to a preselected arbitration precedence, said arbitration controller receiving said arbitration precedence from said node network controller, said arbitration controller being responsive to said priority controller, said arbitration controller providing a transmit inhibition signal to said access controller, and said access controller inhibiting said transmitting irrespective of said authorization signal thereby.

3. The apparatus of claim 1 wherein said priority includes a node drop priority and a network size, said node drop priority including a unique position in a preselected network drop priority cycle respective of the positions of other nodes in said cycle.

4. The apparatus of claim 3 wherein said priority controller further comprises:

a. a storage for receiving said node drop priority from said node network controller;

b. a priority monitor for determining a current priority respective of all nodes in said network; and c. a priority comparator, connected between said storage and said priority monitor for comparing said current priority and said node drop priority, said comparator transmitting said transmit authorization signal when said current priority corresponds with said node drop priority.

5. The apparatus of claim 4 wherein said storage further comprises:

a. a drop priority holding register for storing said node drop priority; and b. a network size holding register for storing said network size.

6. The apparatus of claim 2 further comprising first synchronizing means for synchronizing said priority controller with said arbitration controller.

7. An apparatus for media access control of a first node in network, comprising:

a. a priority controller for providing a transmit authorization signal authorizing said first node to transmit to said network through a powerline communication medium, said authorization signal being responsive to a priority of said first node in relation to other nodes in said network, said priority controller receiving said priority from a node network controller in said first node;

b. an access controller for receiving said transmit authorization signal, said access controller being connected to said priority controller and said node network controller, said access controller communicating a transmit request signal to said node network controller responsive to said transmit authorization signal;

c. an arbitration controller for preventing said first node from transmitting to said network until a predetermined number of said respective other nodes have been allowed to access said network according to a preselected arbitration precedence said arbitration controller receiving said arbitration precedence from said node network controller, said arbitration controller being responsive to said priority controller, said arbitration controller providing a transmit inhibition signal to said access controller, and said access controller inhibiting said transmitting irrespective of said authorization signal thereby; and d. said arbitration controller having:
   i. an arbitration storage for receiving a preselected maximum arbitration cycle length from said node network controller,
   ii. an arbitration timer for providing a current arbitration cycle length, and
   iii. an arbitration comparator, connected to said arbitration storage and said arbitration timer, for comparing said current arbitration cycle length with said preselected maximum arbitration cycle length, said arbitration comparator providing said transmit inhibition signal to said access controller.

8. The apparatus of claim 6 wherein said synchronizing means further comprises second synchronizing means for synchronizing said priority controller and said arbitration controller of one node with priority monitors and arbitration controllers of said respective other nodes, said second synchronizing means being responsive to a transmission on said network, said transmission including a predefined character in said transmission.

9. The apparatus of claim 8 wherein said predefined character in said transmission is a closing FLAG, said closing FLAG having the binary sequence 01111110.

10. A method for communication by a first node in a network having a plurality of nodes, comprising the steps of:

a. sensing a powerline communication medium for the presence of a carrier signal by said first node;

b. inhibiting transmitting by said first node to said network if said presence of said carrier signal is sensed;

c. transmitting at least one data packet, if said carrier signal is not sensed on said network and a current priority period corresponds with a first predetermined priority period; and d. further inhibiting transmitting by said first node to said network for said first predetermined priority period after the termination of said carrier signal, said first predetermined priority period being uniquely assigned to said first node in a predefined relation to predetermined priority periods uniquely assigned to respective others of said plurality of nodes.

11. The method of claim 10 wherein said further inhibiting persists during said first predetermined priority period if said carrier signal is sensed on said network.

12. The method of claim 10 further comprising the step of further inhibiting transmitting by said first node until respective others of said plurality of nodes have been granted a preselected number of opportunities to access said network.

13. A method for communication by a first node in a network having a plurality of nodes, comprising the steps of:

a. sensing a powerline communication medium for the presence of a carrier signal by said first node:

b. inhibiting transmitting by said first node to said network if said presence of said carrier signal is sensed;

c. transmitting at least one data packet, if said carrier signal is not sensed on said network and a current priority period corresponds with a first predetermined priority period, and wherein said first predetermined priority period includes an intermission and a plurality of access slots, respective ones of said plurality of access slots being uniquely assigned to respective ones of said plurality of nodes in said work, and said intermission being interposed between said termination of carrier signal and said plurality of access slots; and d. further inhibiting transmitting by said first node to said network for said first predetermined priority period after the termination of said carrier signal, said first predetermined priority period being uniquely assigned to said first node in a predefined relation to predetermined priority periods uniquely assigned to respective others of said plurality of nodes.

14. The method of claim 13 wherein said first predetermined priority period includes an arbitration cycle, a drop priority cycle includes a predetermined number of said plurality of access slots corresponding to a predetermined number of nodes in said plurality of nodes, said drop priority cycle follows said intermission, and each arbitration cycle has at least one drop priority cycle.

15. The method of claim 13 wherein said termination of said carrier signal is indicated by the reception of a closing FLAG.

16. The method of claim 15 wherein said closing FLAG has the binary sequence 01111110.

17. The method of claim 13 wherein the first access period in said plurality of access periods is assigned to the respective node to which the most recent message was transmitted.

18. A method for communication by a first node in a network having a plurality of nodes, comprising the steps of:

a. sensing a powerline communication medium for the presence of a carrier signal by said first node;

b. inhibiting transmitting by said first node to said network if said presence of said carrier signal is sensed;

c. transmitting at least one data packet if said carrier signal is not sensed on said network, and a current priority period corresponds with a first predetermined priority period;

d. further inhibiting transmitting by said first node to said network for said first predetermined priority period after the termination of said carrier signal, said first predetermined priority period being uniquely assigned to said first node in a predefined relation to predetermined priority periods uniquely assigned to respective others of said plurality of nodes, said further inhibiting persisting during said first predetermined priority period if said carrier signal is sensed on said network;

e. wherein each of said preselected periods includes an intermission and a plurality of access slots, respective ones of said plurality of access slots being uniquely assigned to respective ones of said plurality of nodes in said network, and said intermission being interposed between said termination of carrier signal and said plurality of access slots; and f. wherein said first predetermined priority period includes an arbitration cycle, a drop priority cycle includes a predetermined number of said plurality of access slots corresponding to a predetermined number of nodes in said plurality of nodes, said drop priority cycle follows said intermission, and each arbitration cycle has at least one drop priority cycle.

19. The method of claim 18 further comprising the step of further inhibiting transmitting by said first node until respective others of said plurality of nodes have been granted a preselected number of opportunities to access said network.

20. The method of claim 18 wherein the first access period in said plurality of access periods is assigned to the respective node to which the most recent message was transmitted.

21. The method of claim 18 wherein said termination of said carrier signal is indicated by the reception of a closing FLAG.

22. The method of claim 21 wherein said closing FLAG has the binary sequence 01111110.

* * * * *